Feb. 4, 1964 C. L. SPORCK 3,120,207

METAL WORKING

Filed May 21, 1962

INVENTOR
Claus L. Sporck
BY
Synnestvedt & Lechner
ATTORNEYS

United States Patent Office 3,120,207
Patented Feb. 4, 1964

3,120,207
METAL WORKING
Claus L. Sporck, Cincinnati, Ohio, assignor to The Lodge & Shipley Company, Cincinnati, Ohio, a corporation of Ohio
Filed May 21, 1962, Ser. No. 196,082
2 Claims. (Cl. 113—52)

This invention relates to the manufacture of hollow, generally conical-shaped articles made by the axial displacement of sheet metal blanks.

In the manufacture of articles of the kind in question, it is conventional (for example, see U.S. Patent 1,939,356) to mount a flat disc-shaped blank on the small end of a conical-shaped mandrel and while the blank and the mandrel are rotating, to cause a roller to engage the blank and move over the surface of the mandrel to axially displace the metal of the blank so that the blank takes the conical shape of the mandrel. In order to make cones of different included angles, it has been necessary to provide mandrels having different included angles.

A mandrel is a precision tool which is made from machine tool steel and several of the well-known and expensive metal working processes are used for manufacture, for example, machining, heat treating, grinding and polishing. Unless the required number of articles is rather large, the cost of constructing a mandrel for use in making the articles is prohibitive.

Thus, in many instances articles made in accordance with the techniques of the kind in question are not available for use in fabrication of certain machines and equipment. This is highly undesirable because axially displaced articles have many advantages, for example, a high strength to weight ratio, improved grain structure, dimensional accuracy and improved mechanical properties, such as tensile strength and the like.

The principal object of the present invention is to provide a method whereby articles of the kind in question, having different included angles can be made from a single mandrel.

Figure 1:
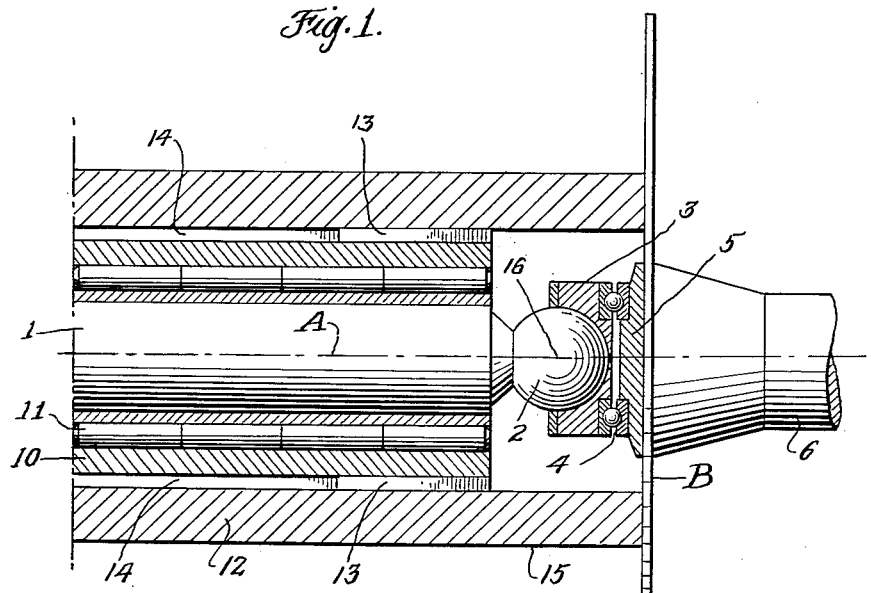
Figure 2:
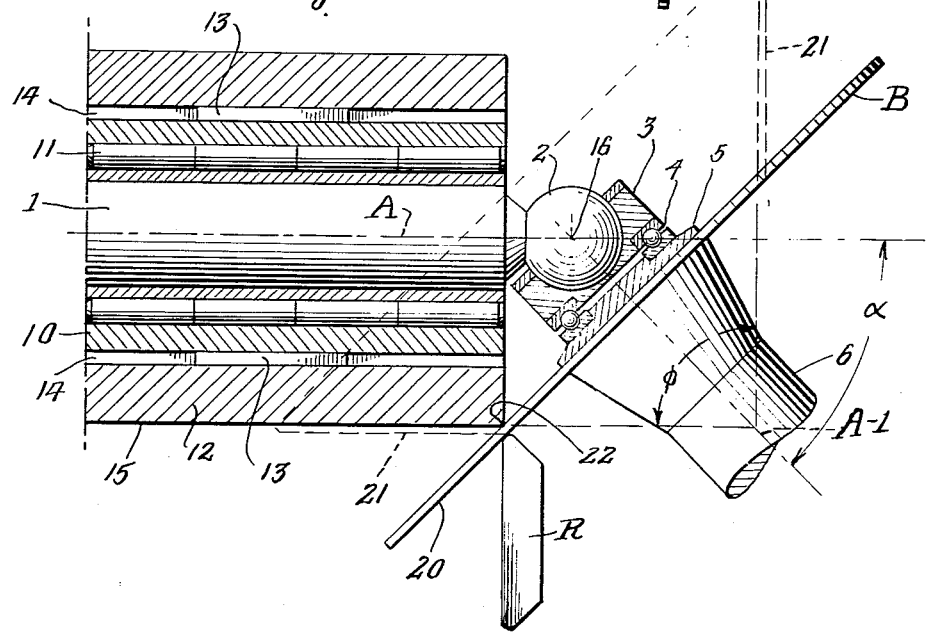

The manner of practicing the invention will be described in connection with the following drawings wherein:

FIGURE 1 is a plan view partially in section illustrating the disposition of certain tools for use in practicing the invention; and FIGURE 2 is a plan view of FIGURE 1 but with the tools positioned for the forming of a flat blank into a generally conical-shaped article.

In FIGURE 1 the post 1 has a spherical head 2. The post is adapted to be fixed with its axis extending in a horizontal or vertical direction. The spherical head 2 mounts a swivel 3 carrying the bearings 4 which rotatably support a plate 5. A blank B is disposed on the plate 5 being held thereon by the rotatable tailstock 6. The rotational axis of the blank is indicated at A. The axis A may be disposed in a horizontal position (as shown) or in a vertical position depending upon the disposition of the machine.

A sleeve 10 surrounds the post and is rotatably mounted on the post as by bearings 11. A mandrel 12 surrounds the sleeve and is provided with several keys 13 accommodated by the keyways 14 fixed to a mandrel 12. By the key and keyway structure, the sleeve and mandrel rotate in unison about the axis A but with the mandrel being movable relative to the sleeve in a direction parallel to the axis A.

The mandrel 12 is adapted to be rotated and to be moved axially by mechanism not shown. The mechanism provides that the mandrel be shifted to and locked in any of a plurality of positions along the axis A and to be rotatable in the locked position.

The mandrel 12 has an outer surface of revolution 15 which in the present instance is a cylindrical surface. The surface 15 is co-axial with the axis A. The surface 15 constitutes a reducing surface over which the blank B is formed or shaped.

For working the blank B, the mandrel 12 is moved to a position such as shown in FIGURE 2 and the tailstock 6 is moved to the left and swung about the center 16 of the head 2. In this position it will be noted that the axis A–1 (which is now the rotational axis of the blank and tailstock 6) is oriented at an angle $\alpha$ with respect to the axis A. A roller R is brought up to the position shown and then moved in a direction parallel to the axis A to displace the outer peripheral portion 20 of the blank. The annular portion 20 is axially displaced and the blank formed into a generally conical-shaped article as indicated by the dotted lines 21. The included angle of the conical article 21 is indicated as being the angle $\phi$ and the angle $\alpha$ is one half this angle.

From the foregoing it will be apparent that orienting the blank B at an angle with respect to the mandrel causes the mandrel to operate as if it were conical-shaped. For a different included angle, the angle $\alpha$ and the axial position of the mandrel are changed.

In connection with the foregoing, it is pointed out that the axes A and A–1 both lie in the same plane and that the point of contact 22 between the surface 15 and the blank also lies in the same plane.

In closing, it is pointed out that the invention may be practiced by having a cylindrically-shaped mandrel mounted for rotation about an axis, but not axially movable, and supporting the blank by clamp mechanism on the tailstock and obtaining different included angles by swinging the blank and tailstock about the point of contact between the blank and the end of the mandrel, such as point 22, and forming the blank over the mandrel surface by means of a roller. The foregoing allows change of included angle with constant nose diameter.

I claim:
1. In a power spinning machine:
a fixed post;
a sleeve surrounding said post;
bearing means rotatably mounting said sleeve on said post;
a cylindrically-shaped mandrel surrounding said sleeve and slidably connected therewith, the mandrel being for use in working a blank;
key and keyway means between said mandrel and said sleeve providing for rotation of the mandrel with the sleeve and permitting sliding motion of the mandrel in a direction along its rotational axis;
a swivel member mounted on said post for swiveling motion in a plane containing the rotational axis of the mandrel;
a plate, the plate being for use in holding a blank to be worked; and
means rotatably mounting said plate on said swivel member for rotation about an axis lying in said plane, the motion of the swivel member orienting the rotational axis of the plate in any one of a plurality of positions in said plane, in each position the plate axis being transverse the rotational axis of the mandrel.
2. In a power spinning machine:
fixed support means;
a mandrel surrounding said support means, the mandrel being for use in working a blank;
means mounting said mandrel on said support means for rotation relative to the support and for sliding motion in a direction along its rotational axis;

a swivel member mounted on said support means for swiveling motion in a plane containing the rotational axis of the mandrel;

a plate, the plate being for use in holding a blank to be worked; and means rotatably mounting said plate on said swivel member for rotation about an axis lying in said plane, the motion of the swivel member orienting the rotational axis of the plate in any one of a plurality of positions in said plane, in each position the plate axis being transverse the rotational axis of the mandrel.

References Cited in the file of this patent

UNITED STATES PATENTS

| | | |
|---|---|---|
| 14,696 | Minard | Apr. 15, 1856 |
| 15,247 | Minard | July 1, 1856 |

FOREIGN PATENTS

| | | |
|---|---|---|
| 154,251 | Switzerland | July 1, 1932 |
| 640,057 | Canada | Apr. 17, 1962 |